P. R. HORNBROOK.
HYDRAULIC TRANSMISSION.
APPLICATION FILED DEC. 20, 1917.

1,304,566.

Patented May 27, 1919.
2 SHEETS—SHEET 1.

Inventor
Philip R. Hornbrook
By Brown Hanson & Bettons
Attorneys

P. R. HORNBROOK.
HYDRAULIC TRANSMISSION.
APPLICATION FILED DEC. 20, 1917.

1,304,566.

Patented May 27, 1919.
2 SHEETS—SHEET 2.

Inventor
Philip R. Hornbrook
By Browne Hanson & Bottom
Attorneys

UNITED STATES PATENT OFFICE.

PHILIP R. HORNBROOK, OF CHICAGO, ILLINOIS.

HYDRAULIC TRANSMISSION.

1,304,566.   Specification of Letters Patent.   Patented May 27, 1919.

Application filed December 20, 1917. Serial No. 208,052.

*To all whom it may concern:*

Be it known that I, PHILIP R. HORNBROOK, a citizen of the United States, residing at Chicago, in the county of Cook and State of Illinois, have invented a certain new and useful Improvement in Hydraulic Transmission, of which the following is a full, clear, concise, and exact description, reference being had to the accompanying drawings, forming a part of this specification.

My invention relates to hydraulic change speed transmission mechanism.

When a load, such as a vehicle, is to be driven by a motor having the characteristics of the internal combustion engine, it is necessary to interpose some mechanism which will translate the high speed and low torque of the internal combustion engine into the low speed and high torque of the vehicle when the same is starting. Heretofore this has been accomplished by the interposition of gears which are changeable in ratio to maintain the proper relation between engine and driven wheels.

It is the object of my invention to provide a hydraulic transmission for connecting a driving motor, having the characteristics of an internal combustion engine, that is, maximum torque at high speed with a load having the characteristics of a vehicle, namely, high torque at low speed. It is to be understood that my invention may be applied in other connections but in the particular conditions I have outlined above, the same is particularly useful.

I accomplish this purpose by the employment of a fluid set into motion by the driving element and operating upon the driven element. The relation of the driving and driven element through the fluid is regulated by a lever under the control of the operator. Specifically, I employ a drum containing a driving propeller of adjustable pitch and a driven propeller. The shaft of the driven propeller is geared to the drum itself; and the shaft of the driving propeller is adapted to be clutched to the drum. By variation of the fluid drive and the clutch drive, a carefully graduated series of relations, consisting of substantially an infinite number of steps, may be established between driving and driven shafts.

In the accompanying drawings, in which I have illustrated an embodiment of my invention—

Figure 1:
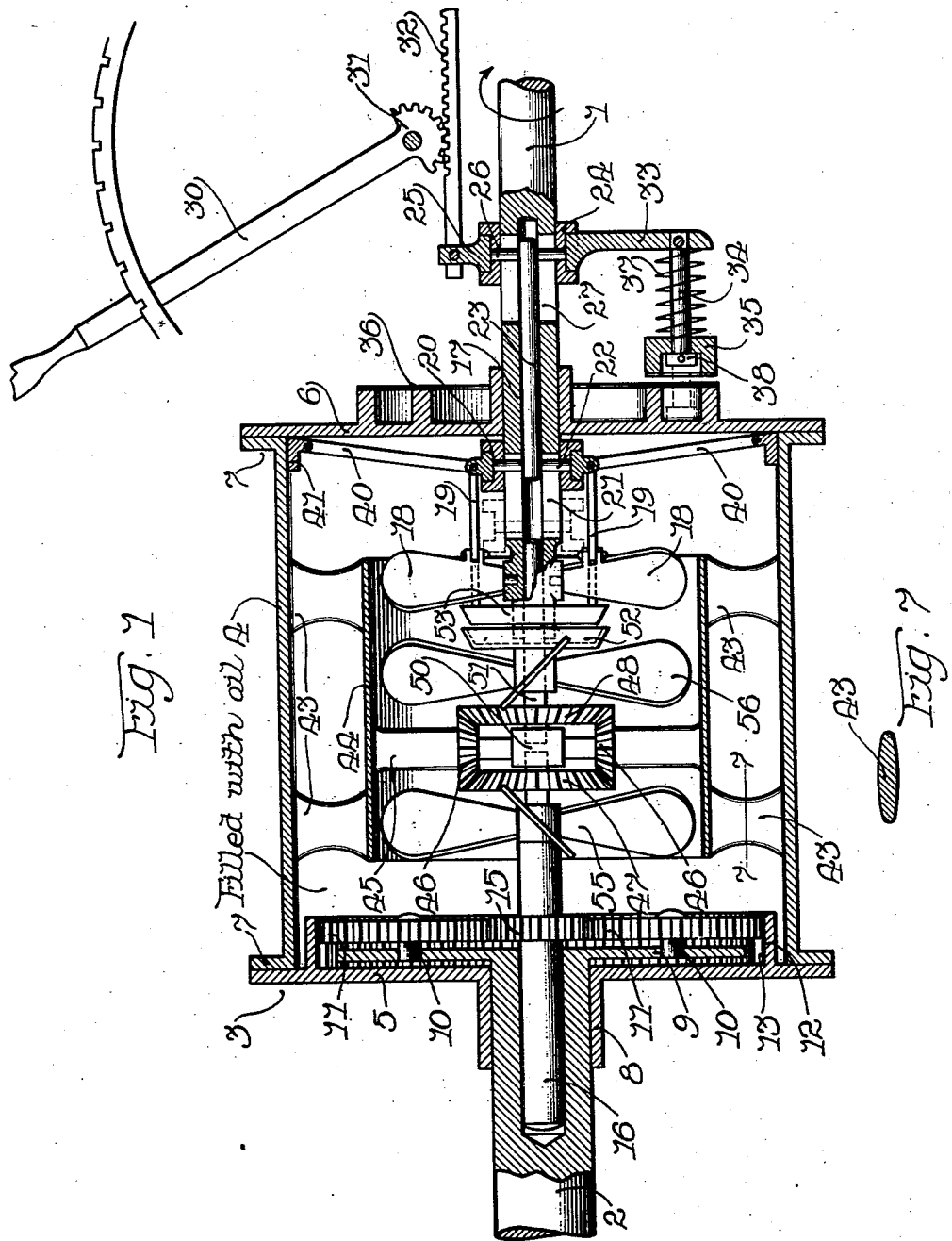

Figure 1 is a longitudinal cross sectional view of a transmission device embodying my invention;

Figs. 2 to 6, inclusive, are diagrams of operation for illustrating the action of the parts; and Fig. 7 is a sectional view of one of the supporting arms taken on the line 7—7 of Fig. 1.

The driving shaft 1 is connected to the motor, preferably an internal combustion engine and the driven shaft 2 is connected to the load (in this case, preferably the driving wheels of an automobile or a similar load). Both shafts 1 and 2 project into a hollow drum 3. This drum comprises a cylinder 4 and the drum heads 5 and 6. The cylinder 4 is provided with suitable flanges by which it is secured to the drum heads 7, 5 and 6. The drum head 5 contains a bearing 8 for the shaft 2, which shaft has a disk 9. Upon the disk 9 are mounted bearing studs 10 supporting gear wheels 11.

The drum head 5 is provided with an inwardly extending annular flange 12 which has planetary gear teeth 13 upon the inner surface thereof, these gear teeth being adapted to mesh with the teeth of the gears 11. The gears 11 constitute idlers between a central pinion 15 and the planetary gear 13. The pinion 15 is mounted upon a rotatable stub shaft 16 which has a bearing in the end of the shaft 2, axially of the same.

The driving shaft 1 has a bearing 17 in the hub of the drum head 6. The inner end of the shaft 1 is provided with a hub upon which are supported the adjustable propeller blades 18, which are connected by links 19 with a sliding block 20. The links 19 extend beyond the adjustable propeller blades 18 and are connected at their inner ends with a cone clutch element as will be hereafter described.

The sliding block 20 is mounted as a collar upon the shaft 1, this shaft being slotted as indicated at 21 to receive a transverse pin 22 which is connected to the central rod 23 and operable by means of the flanged collar 24 and yoke 25. A transverse pin 26 lying in a slot 27 in the shaft 1 connects the flange collar 24 with the rod 23. A suitable operating lever 30 is connected to the yoke 25 for sliding the rod 23 back and forth to vary the pitch of the blades 18. In this case, the connecting mechanism between the lever 30 and the yoke 25 is shown as a sector 31 and rack 32. Any desired connection may be employed.

The yoke 25 is further provided with an extending arm 33 which arm has a brake plunger 34 bearing the brake shoe 35. This brake shoe is adapted to engage the brake surface 36. A spring 37 normally presses the brake shoe 35 against the collar 38 on the end of the brake rod 34, this connection serving as a yielding operating connection between the brake shoe 35 and the brake arm 33.

The slidable block or collar 20 is connected by means of toggle arms 40 with an internal band brake 41 adapted to engage the inner surface of the cylinder 4.

The drum 4 has a plurality of radially extending arms 43 having a cross section shown in Fig. 7 for permitting fluid to flow readily lengthwise of the cylinder 4. Upon the inner ends of these radial arms, there is supported an inner cylinder 44. This cylinder is considerably shorter than the main cylinder 4 and leaves open spaces around the ends of the same and defines an annular passage between the inner cylinder 44 and the main cylinder 4.

Suitable radial arms 45 having a cross section similar to the arms 43 extend inward radially to form supporting bearings for the miter pinions 46. The miter pinions 46 mesh with the miter gears 47—48. The miter or bevel gear 47 is mounted upon the end of the stub shaft 16. The inner end of this shaft is reduced and has a bearing in the central box 50. The miter or bevel gear 48 is mounted upon a stub shaft 51, the inner end of which has a bearing in the central box 50. The opposite end of the stub shaft 51 has a bearing in the end of the driving shaft 1, axially of the same.

The stub shaft 51 bears a cone clutch element 52. A coöperating cone clutch element 53 is splined upon the inner end of the driving shaft 1. The clutch element 53 is connected with the sliding block 20 by the links 19 which links also form a connection between the adjustable propeller blades 18 and the sliding block 20.

The clutch elements 52 and 53 are adapted to clutch the shafts 1 and 51 firmly into engagement under the conditions hereafter set out.

The stub shafts 16 and 51 bear the propellers 55 and 56, these propellers facing in opposite directions and being adapted to be driven in opposite directions through the reversing gears comprising the bevel gears 47—48 and the bevel pinions 46.

Having now outlined the mechanical construction employed, I shall explain the operation of the device under actual use. To this end, I shall set out the action of the parts under the following five conditions.

First, when the transmission device serves as a speed reducer, taking the power delivered from the engine at high speed and low torque and transmitting the same to the load at low speed and high torque.

The second condition is that of transition from the first condition to a condition of direct drive from driving shaft to driven shaft, which last named condition is the third, this being equivalent to a mechanical clutch directly connected between the engine and driven shaft.

The fourth condition is a transition from direct drive to reverse while the parts are in motion and the Fifth condition, which I shall outline, is a reverse drive under true gear reduction condition.

Figure 2:
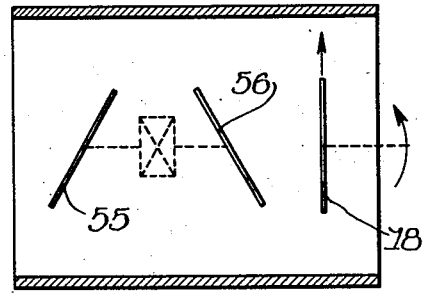

For the neutral condition, the propeller blades 18 are set parallel to the line of motion as shown in Fig. 2. In this condition, the shaft 1 may be rotated without causing any appreciable effect upon the transmission; the only tendency to transmit any motion will be that caused by the resistance of the fluid which normally fills the entire drum 3 against such idle motion of the blades 18. It is to be understood that the drum 3 is normally filled with liquid, preferably oil.

Figure 3:
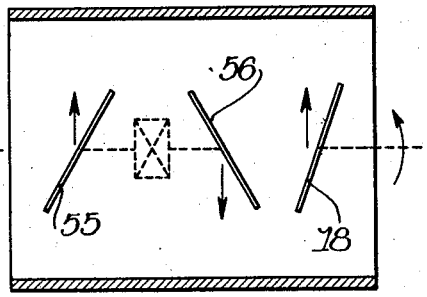

For the first condition, namely, that of starting forward from a standstill, the blades 18 are set as indicated in Figs. 1 and 3. The direction of rotation of the driving shaft 1 is indicated by the arrow at the right of said shaft. As the propeller blades 18 move in the direction indicated by the corresponding arrow in Fig. 3, the liquid within the casing will be given a motion having two components. These two components of the motion of the liquid are respectively an axial movement and a circumferential movement, with respect to the axis of the drum.

The axial component tends to drive the propeller blades 55—56 in opposite directions, as indicated by the arrows in Fig. 3. Inasmuch as these propellers are geared together by the bevel gears, opposite rotation of these parts is accumulative upon the stub shaft 16. As a consequence, the stub shaft 16 is driven in the same direction as the shaft 1; the pinion 15 meshing with the idlers 7 tends to drive the main drum 4 in the negative direction.

I term the negative direction of rotation herein as the opposite of the direction of rotation indicated by the arrow on the shaft 1 of Fig. 1. The negative rotation of the main drum 1 is counteracted in part by the inertia of the drum and in part by the circumferential component of the motion of the liquid. Hence, instead of moving the drum 4, the idlers 11 themselves with the disk 9 and driven shaft 2 will be rotated in a positive direction with a large gear reduction in speed and with an increase in torque.

If desired, the main drum 4 may be held by a brake band during this stage of operation. Instead of a brake band an abutment or overrunning clutch may be employed.

Figure 4:
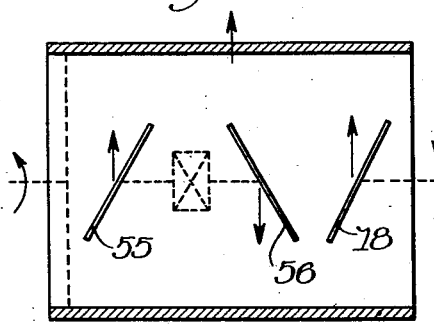
Figure 5:
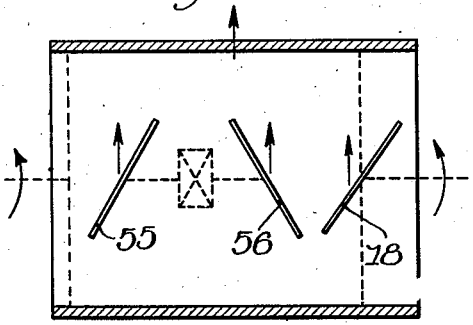

As the driven member tends to come up in speed and requires less torque the propeller blades 18 are set at a greater inclination, as indicated in Fig. 4, with the result that the circumferential component of the liquid becomes greater and the drum itself tends to be driven in the positive direction, thereby decreasing the gear reduction and tending to drive the shaft 2 at the same rate as the shaft 1. At this stage of operation, the axial back-thrust created by the recoil of the propeller blades 18 due to a slightly unbalanced condition of the blades 18 as to effective area of blade tends to throw the expanding clutch 41 into engagement with the drum 4 and to hold it in engagement therewith, thereby tending to drag the drum positively in the same direction in which the driving shaft 1 is moving. At such time the lever 30 is of course unlocked.

When it is desired to drive the shaft 2 at the same rate of speed as the shaft 1, the rod 23 is moved farther to the right, causing the expanding brake 41 to grip the drum 4, driving the same positively. As a consequence, the drum 4 is driven forward in the positive direction at the same speed as the propeller blades 18. Consequently, the motion of liquid axially within the drum ceases and in fact the proper motion of the liquid is entirely gone. The liquid moves around with the drum, circumferentially only. The driving force is now applied at the planetary gear 13 and as this is connected to the idlers on the disk 9 with the driven shaft 2, the tendency for the shaft 2 to follow at the same rate of speed as the drum 3 is very great because any slippage of the drum with respect to the shaft 2 results in driving the propellers 55—56 at a high rate of speed in opposite directions to each other, so that these parts form an effective brake against such motion. Any slippage of the drum 3 would also immediately create an axial movement of the liquid in the casing 1, this axial movement of the liquid would act on the propeller blades 18 to cause further engagement of the expanding brake 41 with the drum 4.

In other words, there will be a small slippage between the drum 3 and the shaft 2 but this will be only so much as to raise the neccessary resistance against movement of the propellers 55—56, otherwise clutching these two parts together.

At this stage of operation, the transmission device operates substantially as a through clutch connecting the shafts 1 and 2 together.

While the parts are operating in this condition, it is possible to vary the driving relation and shift the parts so as to get a reverse drive. To do this, the lever 30 is thrown to the right, thereby causing the brake shoe 35 to be applied to the drum to hold the same against movement, the expanding brake 41 is released from the drum 4 and the cone clutch 52—53 is positively engaged. The result is that the main drum 3 comes to rest and a direct mechanical drive from the shaft 1 to the clutch 52—53, the reversing gears 46—47—48, the stub shaft 16 and the gear reduction between the pinion 15 and the idlers 11, results in driving the shaft 2 in the reverse direction at low speed.

It will be noted that during the reverse operation, the brake shoe 35 engages the braking surface 36 on the drum 3 and holds the same stationary for driving the shaft 2 in the reverse direction. As previously explained, an overrunning clutch in the nature of a pawl and ratchet might be employed inasmuch as the drum 3 is never intended to rotate except in the forward, that is, the positive direction.

Figure 6:
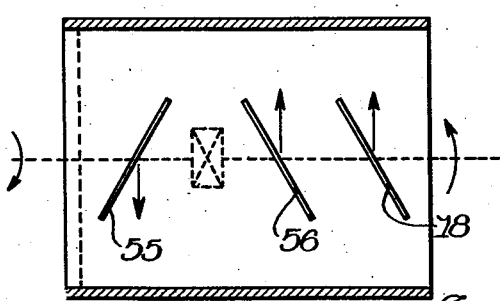

Fig. 6 illustrates the position of the parts during reverse operation.

It can thus be seen that according to my invention it is possible to take the motion from the constant speed shaft 1 and by a smooth and gradual shifting drive the shaft 2 from a standstill condition at the maximum torque to full speed condition with respect to shaft 1 and equally well into reverse relation with respect to shaft 1 by movement of the lever 30. A further flexibility is secured by the liquid medium connecting the driving and the driven shafts 1 and 2, respectively, whereby the power is transmitted in a smooth flow rather than as a series of shocks. The invention is ideally adapted to form the connection between the well known gasolene engine and the vehicle comprising an automobile.

I claim:

1. In combination, a driving shaft, a driven shaft, a drum rotatably connected with respect to both shafts, said drum containing a body of fluid, an adjustable fluid propeller connected to the driving shaft, a stub shaft having a propeller adapted to be driven by the movement of the fluid, and gears connecting said stub shaft, said driven shaft, and said drum.

2. In combination, a rotatable drum, a driven shaft projecting into said drum and independently rotatable, a driving shaft projecting into the drum, a driving propeller, connected to said driving shaft, a driven propeller connected to said driven shaft, a body of fluid in said drum between said propellers, means for adjusting the driving ratio between said propellers and means for transmitting the driving effort through the drum.

3. In combination, a drum adapted to contain fluid, a driving shaft connected into the drum, clutch means for connecting the driving shaft and the drum, a driven shaft projecting into the drum, a stub shaft geared to said driven shaft and to said drum, and means co-acting with the fluid in the drum for controlling the rotation of said shaft.

4. In combination, a drum adapted to contain fluid, a driving shaft projecting into the drum, a driven shaft projecting into the drum, an annular gear connected to the drum, an idler connected to said shaft, a stub shaft having a pinion meshing with said idler, means for clutching the driving shaft to the drum and means connected to the stub shaft for resisting rotation of the same.

5. In combination, a drum adapted to contain a working fluid, a driving shaft projecting into the drum, a driven shaft projecting into the drum, a stub shaft, gears connecting the driven shaft with the drum and the stub shaft, clutch means for the driving shaft for connecting the same to the drum and other clutch means for connecting said driving shaft to said stub shaft.

6. In combination, a rotatable drum, a driving shaft projecting into the drum, a driven shaft projecting into the drum, an adjustable propeller connected to the driving shaft, a propeller connected to the driven shaft, means for varying the adjustment of said propeller while the driven shaft is operating and means for transmitting the driving effort through the drum.

7. In combination, a rotatable drum having heads, a driving shaft having a bearing in one of said heads, a driven shaft having a bearing in the other of said heads, an inner sleeve within said drum, said sleeve defining an annular space, a fluid adapted to flow around said annular space and through the interior of the sleeve, an adjustable propeller connected to the driving shaft, a propeller connected to the driven shaft, and braking means for governing the rotation of the drum.

8. In combination, a container containing a working fluid, a driving shaft having means within the container for actuating said fluid, a driven shaft having means within the container for actuation by said fluid, gears connected between said fluid actuated means and the driven shaft, and a mechanical clutch for connecting the driving shaft to the container or to the fluid-driven means.

9. In combination, a container, a working fluid therein, a driving shaft having means within the container for actuating said fluid, two driven shafts adapted to be actuated in opposite directions, gears supported by the container connecting the driven shafts, fluid actuated means for the driven shafts, and a mechanical clutch for connecting the driving shaft to one of the driven shafts or to the container.

10. In a power transmission mechanism of the kind described, a driving shaft, a driven shaft, a drum adapted to contain a working fluid and rotatably connected as to both shafts, a reversible fluid propeller connected to the driving shaft, a driven propeller, means connecting the driven propeller to the driven shaft, and means connecting said driven propeller with said drum.

11. In a power transmission mechanism of the kind described, a driving shaft, a driven shaft, a drum adapted to contain a working fluid and rotatably connected as to both shafts, a reversible fluid propeller connected to the driving shaft, two opposite direction driven propellers, gears connecting said driven propellers for cumulative power effect, and means operatively connecting said driven propellers the driven shaft and the drum.

12. In a power transmission mechanism of the kind described, a driving shaft, a driven shaft, a drum adapted to contain a working fluid and rotatably connected as to both shafts, a reversible fluid propeller connected to the driving shaft, a same direction driven propeller and an opposite direction driven propeller, gears connecting said two driven propellers for cumulative power effect, means operatively connecting said driven propellers to the driven shaft, and a clutch for rotatably connecting the driving propeller to the reverse rotation driven propeller.

13. In a power transmission mechanism of the kind described, a drum adapted to contain a working fluid, a driving shaft projecting into the drum, clutch means for connecting the driving shaft and the drum, a fluid actuator on said driving shaft, a driven shaft projecting into the drum, a stub shaft geared to said driven shaft and to the drum, and a fluid actuated device on said stub shaft.

14. In a power transmission mechanism of the kind described, a drum adapted to contain a working fluid, a driving shaft projecting into the drum, clutch means for connecting the driving shaft and the drum, a fluid actuator on said driving shaft, a driven shaft projecting into the drum, a stub shaft geared to said driven shaft and to the drum, and a reverse rotation fluid-actuated device geared to said stub shaft for effecting rotation thereof.

15. In a power transmission mechanism of the kind described, a drum adapted to contain a working fluid, a driving shaft projecting into the drum, clutch means for connecting the driving shaft and the drum, a fluid actuator on said driving shaft, a driven shaft projecting into the drum, a stub shaft geared to said driven shaft and to the drum, a reverse rotation fluid actuated device geared to said stub shaft and a clutch for mechanically connecting the driving shaft to said reverse rotation device, and means for holding the drum against rotation.

16. In a power transmission mechanism of the kind described, a drum adapted to contain a working fluid, a driving shaft projecting into the drum, a driven shaft projecting into the drum, a propeller on the driving shaft for actuating the fluid, a propeller geared to the driven shaft for actuation by the fluid, means for clutching the driving shaft to the drum, a stub shaft geared to the driven shaft, means connected to the stub shaft for resisting rotation of same.

17. In a power transmission mechanism of the kind described, a drum adapted to contain a working fluid, a driving shaft projecting into the drum, a driven shaft projecting into the drum, a propeller on the driving shaft for actuating the fluid, a stub shaft geared to the driven shaft, means for clutching the driving shaft to the drum, and a reverse propeller geared to the stub shaft for resisting rotation of the same.

18. In a transmission mechanism of the kind described, a rotatable drum, a working fluid therein, a driving shaft projecting into the drum, a propeller on said shaft for actuating the fluid, a driven shaft projecting within the drum, a propeller within the drum for actuation by the fluid, gears connected between the driven propeller and the driven shaft, and a clutch for connecting the driving shaft to the drum or to the fluid driven propeller.

19. In a transmission mechanism of the kind described, a rotatable drum, a working fluid therein, a driving shaft projecting into the drum, a propeller on said shaft for actuating the fluid, a driven shaft projecting within the drum, a propeller within the drum for actuation by the fluid, means gearing the driven propeller to the driven shaft, a clutch for connecting the driving shaft to the drum or to the fluid driven propeller and a brake for holding the drum against rotation.

20. In a transmission mechanism of the kind described, a rotatable drum, a working fluid therein, a driving shaft projecting into the drum, a propeller on said shaft for actuating the fluid, a driven shaft projecting within the drum, a propeller within the drum for actuation by the fluid, gearing operatively connecting the driven shaft, the drum and the driven propeller.

21. In a transmission device of the kind described, a drum adapted to contain a working fluid, a driving shaft projecting within the drum, a propeller on the driving shaft for actuating the fluid, two driven shafts geared for rotation in opposite directions, fluid actuated means for the driven shafts and a clutch for operatively connecting the driving shaft to one of the driven shafts or to the drum.

22. In a transmission device of the kind described, a drum adapted to contain a working fluid, a driving shaft projecting into the drum, a propeller on the driving shaft for actuating the fluid, two driven shafts geared for rotation in opposite directions, fluid actuated means for the driven shafts, a clutch for operatively connecting the driving shaft to one of the driven shafts or to the drum and brake means for holding the drum against rotation.

In witness whereof, I hereunto subscribe my name this 12th day of December, A. D. 1917.

PHILIP R. HORNBROOK.